United States Patent [19]

Munzinger et al.

[11] Patent Number: 4,689,717
[45] Date of Patent: Aug. 25, 1987

[54] CAST HOUSING FOR MEDIUM-VOLTAGE SWITCHGEAR

[75] Inventors: Karl Munzinger, Oberhasli; Jörg Peter, Bülach; Andreas Plessl, Niederrohrdorf; Denis Poole, Kleindöttingen; Jan G. Vit, Turgi, all of Switzerland

[73] Assignee: BBC Brown, Boveri & Company, Limited, Baden, Switzerland

[21] Appl. No.: 846,124

[22] Filed: Mar. 31, 1986

[30] Foreign Application Priority Data

May 20, 1985 [CH] Switzerland .................. 2138/85

[51] Int. Cl.$^4$ .................. H02B 5/00; H02B 7/00
[52] U.S. Cl. .................. 361/335
[58] Field of Search .................. 361/335, 341, 331, 332

[56] References Cited

U.S. PATENT DOCUMENTS

| | | | |
|---|---|---|---|
| 4,343,030 | 8/1982 | Date et al. | 361/335 |
| 4,503,481 | 3/1985 | Fujiya et al. | 361/335 |
| 4,523,253 | 6/1985 | Grünberg et al. | 361/335 |

Primary Examiner—Roy N. Envall, Jr.
Attorney, Agent, or Firm—Burns, Doane, Swecker & Mathis

[57] ABSTRACT

A cast housing is provided for carrying switchgear components, such as a power switch or circuit-breaker, a busbar, a disconnecting switch and a grounding switch and bushings, to a multi-phase medium-voltage switchgear. It is substantially cuboid-shaped and is filled with an insulating gas. This cast housing is designed such that it may be used without substantial modifications in all possible designs of switchgear for a given switchgear voltage. This is achieved by the cast housing having large openings at the front wall and at the side surfaces adjoining the front wall and having a comparatively small opening at each of the rear walls and the top and bottom surfaces for each phase of a switchgear having from one to four phases. At the same time, the supply terminals of the phases of the power switch or circuit-breaker can be brought through the opening located in the front wall into the interior of the cast housing, in each case the phase conductors of the busbar can be led through the openings located in the side walls and either a bushing conductor, directed along a mid-axis of this opening, can be led through each of the remaining openings to a further live switchgear component, or this opening can be closed off by a cover or a cast wall.

8 Claims, 5 Drawing Figures

4,689,717

CAST HOUSING FOR MEDIUM-VOLTAGE SWITCHGEAR

FIELD OF THE INVENTION

The invention relates to cast housings for multiphase medium-voltage switchgear.

BACKGROUND OF THE INVENTION

Such a cast housing is known, for example, from German Patent Publication No. 3,235,800. The known cast housing which provides for carrying live components in medium-voltage switchgear has a substantially cuboid-shaped design and has closable flange openings in front and rear walls as well as on the top and bottom surfaces of the cast housing for the passage of connecting lines of the live components. Such a cast housing is adapted to the design of the specific medium voltage switchgear employed. A conversion or expansion of this switchgear is therefore not readily possible.

OBJECT AND SUMMARY OF THE INVENTION

The object of this invention is to provide a cast housing of the generic type which can be used without substantial modifications in all possible designs of switchgear for a given switchgear voltage.

This object is achieved by a substantially cuboid-shaped designed cast housing having openings arranged to receive supply terminals of the phases of the power switch or circuit breaker. The openings are positioned to provide a variety of components to be installed in the housing. The cast housing according to the invention is characterized by being produced in large numbers and, therefore, inexpensively, and by being usable for all important designs of medium-voltage switchgear demanded by the market. Furthermore, an already existing medium-voltage switchgear including such a cast housing can be converted and expanded without problems.

DESCRIPTION OF THE DRAWING

The cast housing according to the invention is explained in more detail below with reference to a preferred embodiment illustrated in the drawing, in which.

DETAILED DESCRIPTION OF THE PERFERRED EMBODIMENT

Figure 1:
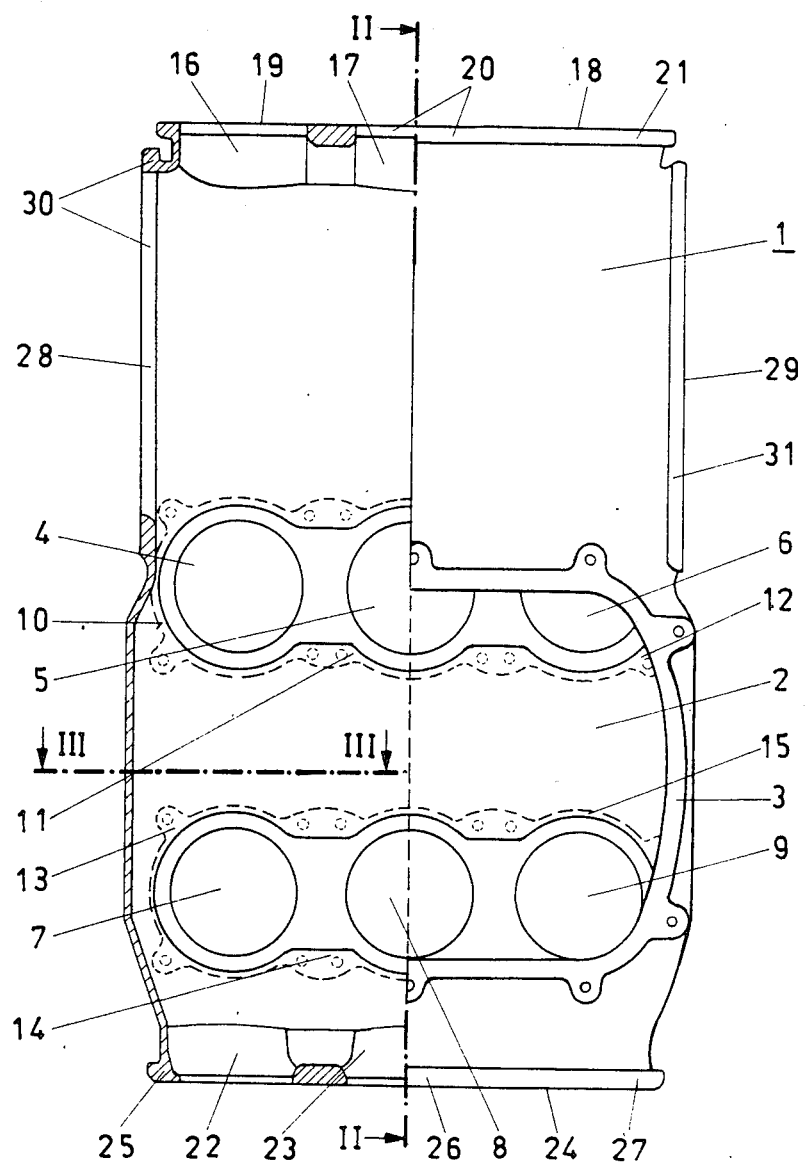
FIG. 1 shows a front view of the preferred embodiment of the cast housing according to the invention in section along the line I—I of FIG. 3.
Figure 2:
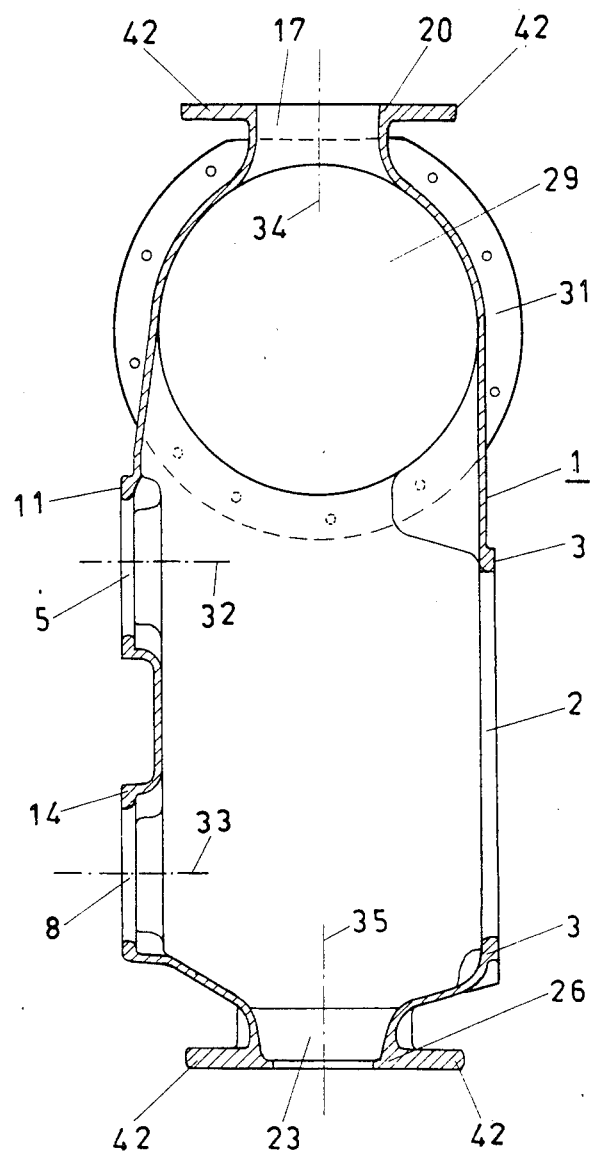
FIG. 2 shows a view of a section along the line II—II of FIG. 1 through the preferred embodiment.
Figure 3:
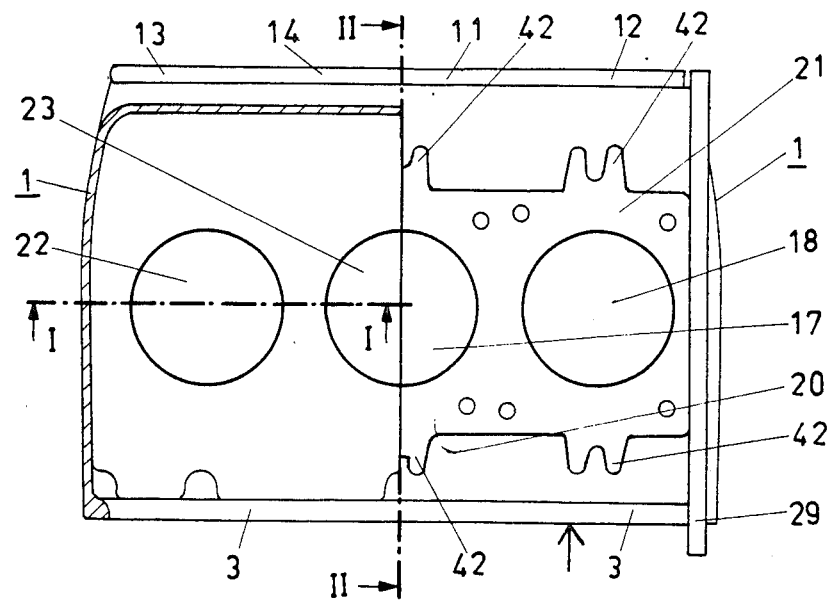
FIG. 3 shows a view from above of the preferred embodiment in section along the line III—III of FIG. 1.

The cast housing 1, illustrated in FIGS. 1 to 3 is preferably made of metal, such as aluminum or steel, and has a substantially cuboid-shaped design. In its front side, evident in the right half of FIG. 1, a comparatively large opening 2 or approximately oval shape may be seen, which is bounded by a flange 3 located on the housing wall. In the rear side of the cast housing 1 are provided two rows of comparatively small circular openings 4, 5, 6 and 7, 8, 9, respectively, which are arranged alongside one another and which are bounded by flanges 10, 11, 12 and 13, 14, 15, respectively, which are not visible and are, therefore, illustrated by broken lines. Pairs of these openings, for example 4, 7 or 5, 8, are arranged one above the other. In the top surface of the cast housing 1 are provided three further comparatively small circular openings 16, 17, 18 which are bounded by flanges 19, 20, 21. In the bottom surface as well, three comparatively small circular openings 22, 23, 24 are provided, which are bounded by the flanges 25, 26, 27, respectively. Furthermore, in the side walls, two comparatively large openings 28, 29 are provided, which are bounded by flanges 30 and 31, respectively.

As is evident from FIG. 2, groups of four of the openings located on the rear wall as well as on the top and bottom surfaces, for example 5, 8, 17, 23, have mid-axes, for example 32, 33, 34, 35 which extend through these openings, which lie in a common plane, each axis standing perpendicular to the flange plane which is formed by the flange, for example 11, assigned to the opening, for example 5. At the same time, the two mid-axes 32, 33 of the openings 5, 8 located in the rear wall are aligned in parallel to each other and lie diametrically opposite the two openings 17 and 23 located in the top and bottom surfaces, so that the mid-axes 34 and 35 of the latter are common to both openings 17 and 23. The four abovementioned openings 5, 8, 17, 23 are generally assigned to one phase of a multi-phase medium-voltage switchgear.

Figure 4:
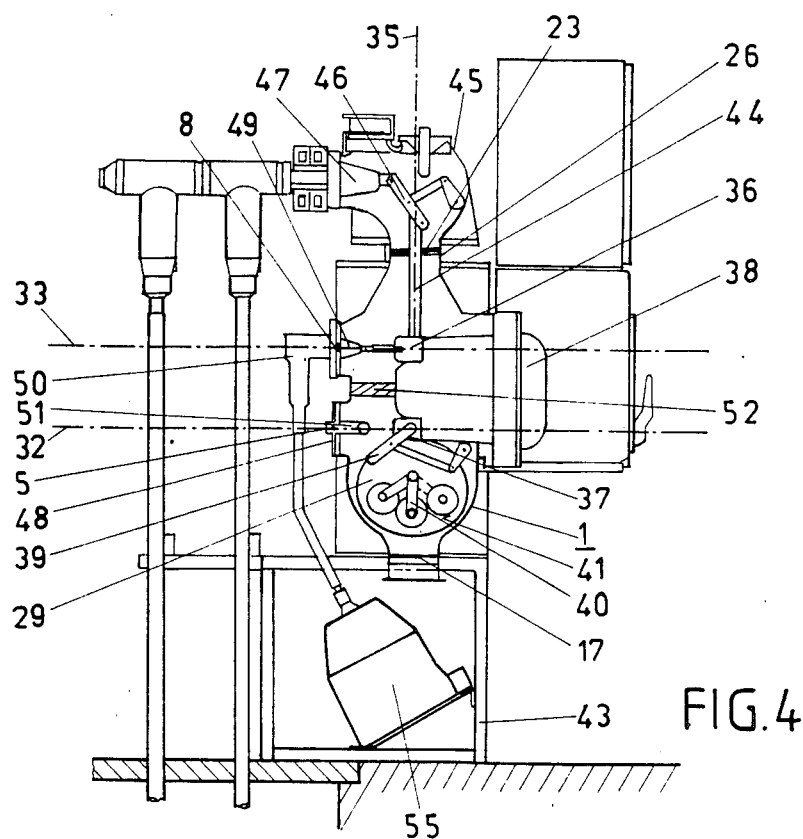
FIG. 4 shows a plan view of a section along one phase through a multi-phase medium-voltage switchgear in which he preferred embodiment of the cast housing according to the invention in accordance with FIGS. 1 to 3 is used.

It is evident from FIG. 4 how the cast housing 1 described above may be used as a central carrier element for one configuration of the medium-voltage switchgear. The supply terminals 36, 37 of a 3-phase power switch or circuit breaker 38 are led into the interior of the cast housing 1. The 3-phase power switch or circuit-breaker 38 is fixed on the flange 3 and closes the opening 2. Also located in the housing are a disconnecting switch 39 with three operating positions, the moving contact of which is supported on the supply terminal 37, and a 3-phase busbar 40, which carries a fixed contact of the disconnecting switch 39 and the phase conductors of which are led out of the cast housing 1 supported on segregating insulators 41 which close the openings 28, 29.

The cast housing 1 is inverted 180° relative to its representation in FIGS. 1 to 3 and is bolted onto a carrying frame 43 by means of fastening elements 42 (FIGS. 2, 3) which are attached to the flanges 19 to 24. The opening 17 is already made during casting of the cast housing 1 and is closed by a pressure relief valve designed as a rupture disk, whereas a rod 44 of conductive material is led through the opening 23 and is supported in an insulating manner on the cast housing 1. Unlike the opening 17, the opening 23 is not made during casting of the cast housing 1 but, rather, by breaking out a gas-tight wall produced during casting. The lower end of the rod 44 is fitted into a coupling element of the supply terminal 36 aligned in the direction of the mid-axis 35. The upper end of the rod 44 is led into a housing 45, which is mounted in a gas-tight manner on the flange 26 bounding the opening 23, and there it carries the moving contact of a further disconnecting switch 46 located in the housing 45. A fixed contact of the disconnecting switch 46 is attached to the conductor of a bushing 47 protruding into the housing 45 and leading to an undesignated cable terminal.

The openings 5 and 8 located in the rear side of the cast housing 1 are closed off by means of a cover 48 or a gas-tight bushing 49 leading to a cable plug terminal 50 of a voltage transformer 55. The cover 48 contains a transparent plate of electrically insulating material, through which a contact 51 recessed into the plate and having a ground potential is led out of the interior of the cast housing 1. The moving contact of the disconnecting switch 39 may be brought into engagement with this contact 51. At the same time, the three operating positions of the disconnecting switch 39, ie. its disconnected position or the engagement of its moving contact with the fixed contact located on the busbar 40 or the contact 51 at ground potential can be observed through the transparent plate provided in the opening 5. The conductor of the bushing 49 is led along the mid-axis 33 through the opening 8 and is plugged onto a coupling element of the supply terminal 36 aligned in the direction of this mid-axis. Corresponding to the supply terminal 36, the supply terminal 37 of the power switch or circuitbreaker 38 also has a coupling element (likewise not designated in FIG. 4) which is aligned along the mid-axis 32 of the opening 5.

The alignment of the coupling elements on the supply terminals 36 and 37 and the corresponding arrangement of the openings, in particular those on the rear wall, the top surface and the bottom surface, make it possible to flange any additional switchgear components desired, onto the cast housing 1 via bushings. Examples of such components are current transformers, voltage transformers, arresters, disconnecting switches, cable plug terminals or lines to other busbars, depending on requirements on the medium-voltage switchgear.

Usually, there are three openings arranged alongside one another, for example 16, 17, 18, each for guiding one of three phase conductors. Openings not required for this, for example the openings 16 and 18 in the perferred embodiment according to FIG. 4, are closed gas-tight by covers. Such covers may have either connections to provide for filling with insulating gas, measuring transducers for switchgear monitoring, such as for leakage detectors or arc protection devices, or moisture absorbers.

Generally, the cast housing 1 only contains one interior space filled with insulating gas of 1 to 2 bar pressure. However it is quite possible, as is evident from FIG. 4, to subdivide the interior space into two mutually segregated spaces. This may be effected in a simple way by a partition wall 52 attached on the inside of the rear wall between the two openings arranged one above the other, for example 5 and 8. This partition wall is aligned substantially parallel to the mid-axes 32, 33 of these openings and is supported in a sealing manner on the power switch or circuit-breaker 38 after its installation. This makes it possible to open both spaces independently of each other to perform interventions in, for instance, the space containing the supply terminal 36 without disconnection of the busbar 40.

Figure 5:
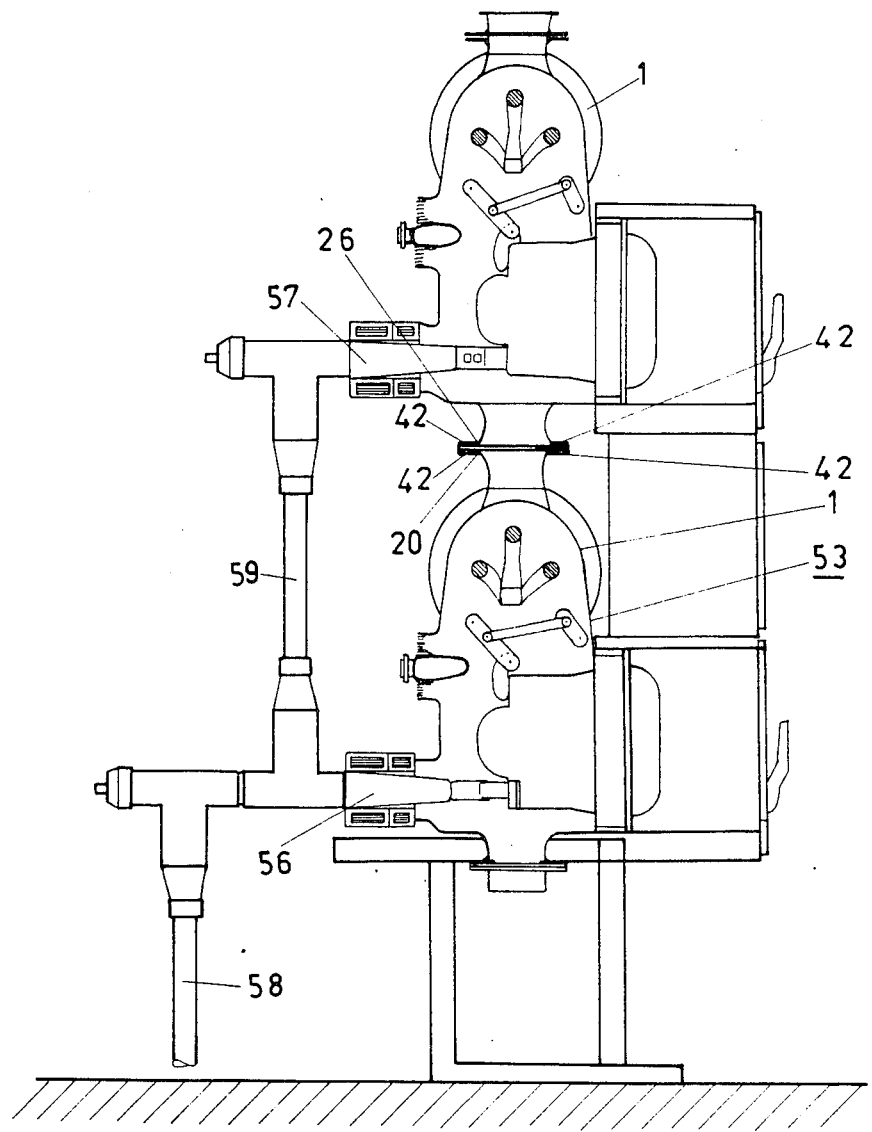
FIG. 5 shows a plan view of a section along one phase through a further multi-phase medium-voltage switchgear in which the preferred embodiment of the cast housing according to the invention, in accordance with FIGS. 1 to 3, is used.

As is evident from FIG. 5, two cast housings 1 may also be readily flanged together to form a two-tier switchgear, by means of fastening elements 42 located on the flanges 19, 20, 21 and 25, 26, 27. If in this case, as illustrated in FIG. 5, a cable plug terminal 56 belonging to the lower cast housing 1 and a cable plug terminal 57 belonging to the upper cast housing 1 are connected to each other via a cable 59 and to a common outgoing cable 58, a duplex field can be realized in a simple way. On the other hand, however, a separate outgoing cable may also be connected to each of the two cast housings 1. In the absence of the connecting cable 59 there then results, in a simple way, a two-tier single busbar switchgear.

It is to be understood that the present invention may be employed in other specific embodiments without departing from the essence of the present invention. The preferred embodiment is, therefore, merely illustrative and is not restrictive. The scope of the invention is indicated by the appended claims rather than by the foregoing descriptions and all claims or variations which fall within the meaning and range of the claims are intended to be embraced therein.

What is claimed is:

1. A multiphase medium-voltage switchgear apparatus comprising:
   an insulating gas-filled, substantially cuboid-shaped cast housing having front, back and side walls and bottom and top surfaces defining an interior of said cast housing, at least said front and back walls and said bottom and top surfaces having openings therein, each of said openings being bounded by a flange, said side openings being diametrically opposed to each other, said rear wall and top and bottom surfaces having rows of openings therein, said openings in said rear, top and bottom rows of openings being smaller than said front and side openings, each of said rear, top and bottom openings being bounded by flanges and having mid-axes passing through and in the direction of said openings, said mid-axes of said rear, top and bottom openings lying in a common plane for each phase,
   a circuit breaker mounted in a gas-tight manner on the flange bounding the front opening and having supply terminals for each phase extending through said front opening into the interior of said cast housing,
   a busbar arrangement having phase conductors supported on two insulators mounted in a gas-tight manner on the flanges bounding the two side openings which are diametrically opposed to each other,
   a disconnect switch mounted within said cast housing and being able to alternatively connect and disconnect said circuit breaker with said busbar arrangement, said disconnect switch having a movable contact,
   a grounding contact arrangement having a grounding contact in each phase for receiving the movable contact of the disconnect switch, said rear openings including a first row of openings and a second row of openings, said first row of openings being covered by a first cover, each grounding contact being supported from said first cover,
   an external electrical component, and
   at least one bushing arrangement having a bushing in each phase in which a bushing conductor establishes an electrical connection between said circuit breaker and said external electrical component, said bushings being supported on the flanges of one of said rows of openings, a second cover being supported on the flanges of another of said rows of openings for closing the openings of said row.

2. A switchgear apparatus as claimed in claim 1, wherein a partition wall is located on the inside of said rear wall between said first and second rows of openings.

3. A switchgear apparatus as claimed in claim 1, wherein said first cover contains a transparent plate of electrically insulating material through which said ground contact is led from the interior of said cast housing.

4. A switchgear apparatus as claimed in claim 2, wherein said first cover contains a transparent plate of electrically insulating material through which said ground contact is led from the interior of said cast housing.

5. A switchgear apparatus as claimed in claim 1, wherein said second cover is provided in the bottom surface and is formed as a gas-tight and breakable part of said cast housing.

6. A switchgear apparatus as claimed in claim 1, wherein said second cover comprises a measured-value transducer for one of a leakage detector and an arc protection device.

7. A switchgear apparatus as claimed in claim 1, wherein said external electrical component is one of a current transformer and a voltage transformer.

8. A switchgear apparatus as claimed in claim 1, wherein the bushing conductor of said bushing is formed by a rod leading through an opening of said row of openings in said top surface, the apparatus further comprising an additional housing, said rod extending into said additional housing.

* * * * *